United States Patent [19]

Quentin

[11] Patent Number: 4,925,911
[45] Date of Patent: May 15, 1990

[54] MOLDABLE/EXTRUDABLE THERMOTROPIC AROMATIC COPOLYESTERAMIDES

[75] Inventor: Jean-Pierre Quentin, Lyons, France

[73] Assignee: Rhone-Poulenc Chimie, Courbevoie, France

[21] Appl. No.: 312,752

[22] Filed: Feb. 21, 1989

Related U.S. Application Data

[63] Continuation of Ser. No. 129,289, Dec. 7, 1987, abandoned.

[30] Foreign Application Priority Data

Dec. 5, 1986 [FR] France .................... 86 17248

[51] Int. Cl.$^5$ .................... C08G 69/44; C08L 77/12
[52] U.S. Cl. .................... 528/184; 528/211; 528/219; 528/271; 528/331
[58] Field of Search ............... 528/184, 211, 219, 271, 528/331

[56] References Cited

U.S. PATENT DOCUMENTS

| | | | |
|---|---|---|---|
| 3,598,864 | 8/1971 | Caldwell et al. | 528/184 |
| 3,987,109 | 10/1976 | Brennan et al. | 568/636 |
| 4,169,933 | 10/1979 | Jackson, Jr. et al. | 528/190 |
| 4,499,256 | 2/1985 | Blundell et al. | 528/172 |
| 4,709,005 | 11/1987 | Quentin | 528/194 |
| 4,717,624 | 1/1988 | Ikenaga et al. | 528/190 |
| 4,727,131 | 2/1988 | Kock et al. | 528/183 |
| 4,764,582 | 8/1988 | Hisgen et al. | 528/183 |

FOREIGN PATENT DOCUMENTS 063881 11/1982 European Pat. Off. .
066359 12/1982 European Pat. Off. .

*Primary Examiner*—Maurice J. Welsh
*Assistant Examiner*—Rabon Sergent
*Attorney, Agent, or Firm*—Sherman & Shalloway

[57] ABSTRACT

High molecular weight thermotropic aromatic copolyesteramides which can be molded/extruded into useful shaped articles having improved mechanical properties are comprised of recurring structural units of the formulae (I), optionally (II), (III) and (IV):

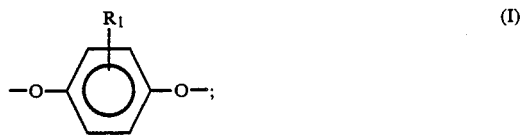

(I)

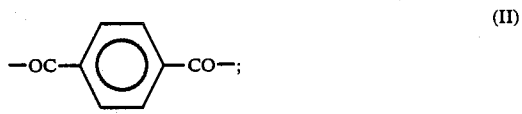

(II)

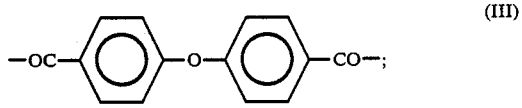

(III)

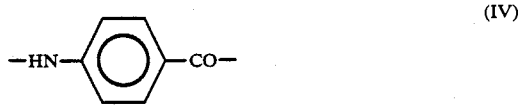

(IV)

and have yield temperatures ranging from 200° to 350° C.

11 Claims, No Drawings

MOLDABLE/EXTRUDABLE THERMOTROPIC AROMATIC COPOLYESTERAMIDES

This application is a continuation of application Ser. No. 129,289, filed Dec. 7, 1987.

BACKGROUND OF THE INVENTION

1. Field of the Invention

The present invention relates to moldable/extrudable thermotropic aromatic copolyesteramides and to the preparation thereof from at least one substituted hydroquinone, or ester/amide-forming derivative thereof, from a mixture of aromatic dicarboxylic acids, or ester-/amideforming derivatives thereof, and from at least one aromatic aminocarboxylic acid, or ester/amide-forming derivative thereof.

2. Description of the Prior Art

Thermotropic polyesters prepared from one or more diphenols and one or more aromatic and/or alicyclic dicarboxylic acids are known to this art. Polyesters of this type are described, for example, in French Pat. No. 2,270,282. Among the polyesters described therein, those produced from a substituted hydroquinone (or ester-forming derivative thereof), terephthalic acid (or ester-forming derivative thereof) and 4,4'-dicarboxydiphenyl ether (or ester-forming derivative thereof) are valuable polymers. Because of the high price of the raw materials for such polymers, it would be desirable to replace a portion of the most expensive reagents, namely, substituted hydroquinone (or derivative thereof) and 4,4'-dicarboxydiphenyl ether (or derivative thereof) by a less expensive compound that is readily commercially available. Moreover, these particular copolyesters have inadequate thermomechanical properties. In particular, their torsional moduli at high temperatures need to be improved.

SUMMARY OF THE INVENTION

Accordingly, a major object of the present invention is the provision of improved thermotropic polymers, which improved thermotropic polymers are comprised of recurring units of para-aminobenzoic acid or ester-/amideforming derivative thereof.

Briefly, the present invention features moldable/extrudable thermotropic aromatic copolyesteramides having high molecular weights, the minimum value of which corresponding to an inherent viscosity of 0.3 dl g$^{-1}$, and comprising recurring units of the formulae (I), optionally (II), (III) and (IV), wherein:

(I) represents the structure:

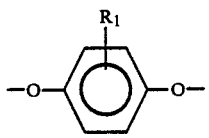

in which R$_1$ is a methyl or ethyl radical or a chlorine or bromine atom, and the recurring units (I) may either be identical or different;

(II) represents the structure:

(III) represents the structure:

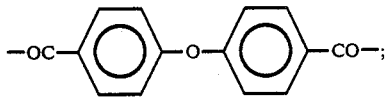

(IV) represents the structure:

the molar ratio of the units (I) relative to the sum of the units (II)+(III) ranges from 0.95 to 1.05; the number of units (II) in the mixture (II)+(III) ranges from 0 to 70 mol % and the number of units (III) relative to the same mixture ranges from 100 to 30 mol %; the number of units (IV) relative to the number of units (I) ranges from 5 to 100 mol %; and said copolyesteramides have a yield temperature ranging from 200° to 350° C.

DETAILED DESCRIPTION OF THE PREFERRED EMBODIMENTS OF THE INVENTION

More particularly according to the present invention, the recurring structural units of formula (I) are derived from a monosubstituted hydroquinone (substituted by a methyl or ethyl radical, or by a chlorine or bromine atom) or diester thereof. It will be appreciated that the structural units (I) may also be derived from a mixture of two or more monosubstituted hydroquinones or diesters thereof, each of which having the formula (I).

The recurring structural units of formula (II) are derived from terephthalic acid or derivative thereof, such as, for example, a dihalide or a diester.

The recurring structural units of formula (III) are derived from 4,4'-dicarboxydiphenyl ether or from a derivative thereof, such as, for example, a dihalide or a diester.

The recurring structural units of formula (IV) are derived from para-aminobenzoic acid or from a derivative thereof, such as, for example, the compound obtained by acylation of the amine group, or the compound obtained by esterification of the acid group or a halide of the acid group.

In a preferred embodiment of the invention, the copolyesteramides have a structure, as defined above, in which:

The number of units (II) in the mixture (II)+(III) ranges from 20 to 60 mol % and the number of units (III) relative to the same mixture ranges from 80 to 40 mol %; and the number of units (IV) relative to the number of units (I) ranges from 10 to 60 mol %.

Exemplary of these preferred aromatic copolyesteramides, particularly representative are those polymers having a structural formula in which the units (I) are identical, with the substituent R$_1$ being methyl radicals or chlorine atoms. Such units (I) are derived from methylhydroquinone, chlorohydroquinone, or diesters thereof.

With respect to the inherent viscosity thereof, this is determined at 25° C. using a solution containing 0.5 g of copolyesteramide per 100 cm³ of a parachlorophenol:1,2-dichloroethane (50:50 by volume) solvent-mixture. The copolyesteramides according to the present invention have an inherent viscosity at least equal to 0.3 dl g⁻¹. They preferably have an inherent viscosity at least equal to 0.5 dl g⁻¹, and, more preferably, ranging from 0.5 to 4.0 dl g⁻¹.

As regards the yield temperature, this preferably ranges from 260° to 330° C. By "yield temperature" is intended that temperature at which the edges of a sample, in the form of a shaving of the polymer or of a cut fiber, begins to become rounded off. This temperature is determined by the visual observation of the sample on a cover slip at an appropriate rate of temperature increase, generally on the order of 10° to 20° C. per minute, the observation being made using a microscope equipped with a heating stage, commercially available under the trademark THERMOPAN.

The copolyesteramides according to the present invention also include polymers which may additionally comprise recurring aromatic structural units which form ester and amide linkages (dioxy units and/or dicarbonyl units and/or mixed secondary amino-carbonyl units), which additional units have a structure other than those of units (I), (II), (III) and (IV). These additional structural units are present in defined proportions such as not to adversely affect the thermotropic properties of the copolyesters of the invention. Representative such additional structural units are the following:

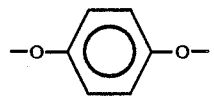

(I')

and/or

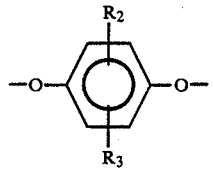

(I'')

in which R₂ and R₃, which may be identical or different, each have the definition given above for R₁, and thus the units (I') may also be identical or different,

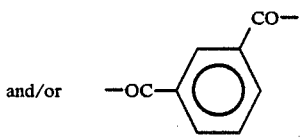

(II')

and/or

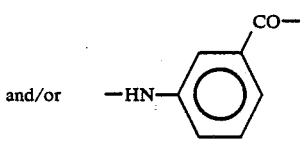

(IV')

and/or

The recurring structural units of formula (I') are derived from unsubstituted hydroquinone or from a diester thereof.

The recurring structural units of formula (I'') are derived from a disubstituted hydroquinone, from a diester thereof, or from a mixture of disubstituted hydroquinones or diesters thereof.

The recurring structural units of formula (II') are derived from isophthalic acid or from a derivative thereof, such as, for example, a dihalide or a diester.

The recurring structural units of formula (IV') are derived from meta-aminobenzoic acid or from a derivative thereof.

In general, the total number of additional structural units which may be present and, in particular, the total number of units (I') and/or (I'') and/or (II') and/or (IV') will be at most equal to 10 mol % relative to the number of units (I). The total number of all dioxy units and all dicarbonyl units present in the subject copolyesteramides in this instance must, of course, be such that the molar ratio of the total amount of dioxy units relative to the sum: total amount of dioxy units+total amount of dicarbonyl units, ranges from 0.95 to 1.05.

The copolyesteramides according to the present invention have the important characteristic of being thermotropic, i.e., they form anisotropic molten masses which are easy to shape by spinning, conversion to film or molding. Thermotropy is easy to demonstrate when the molten polymer is observed under an optical system equipped with two cross-polarizers (90°): a birefringence and a transmission of polarized light through the cross-polarizers occur in the case of anisotropic samples. The anisotropy of the polyesteramides of this invention was demonstrated by the thermooptic TOT method described in French Pat. No. 2,270,282.

Because of this, the molten masses in the anisotropic state have a characteristic orientation and a relatively high degree of organization which can also be demonstrated in shaped articles such as threads, films, extrudates and molded articles, thus providing (already in the crude state) improved properties such as modulus and toughness (which are not usually present in isotropic raw materials).

It should be appreciated that these anisotropic molten masses have an anisotropy region extending over at least 30° C. By "anisotropy region" is intended the temperature range which begins at the temperature at which birefringence and light transmission through the two cross-polarizers occurs and which is above said temperature. The range has a variable upper limit. In said range the molten mass is anisotropic and there is no decomposition of the copolyesteramide.

The copolyesteramides according to the present invention may be shaped using any known process such as molding, spinning, conversion into film, etc., carrying out each operation, of course, within the anisotropy region so as to produce shaped articles having satisfactory properties. The presence of mixed secondary amino/carbonyl (IV) units in the structure of the copolyesteramides of the invention enables the average price of the raw materials to be decreased and consequently the cost of production of shaped articles produced from these copolyesteramides to be minimized. Moreover, for example in the case of molded articles, a substantial improvement is observed (in comparison with the shaped polymers devoid of the aminoacid recurring units) in the values for certain mechanical properties, especially torsional modulus, and, additionally, better maintenance of mechanical properties with changing temperature is also observed.

It too is possible to further improve the mechanical properties, especially those of thin articles, by heat treatment at high temperatures, below the melting temperature of the polymer.

Depending upon the particular application intended therefor, the copolyesteramides according to the invention may include the usual additives such as, especially, coloring agents, stabilizers against the effects of light, oxygen and heat, fillers or reinforcing fillers and flame retardants.

The copolyesteramides according to the present invention may be prepared by different known polymerization methods.

For example, they may be prepared by reacting:

(1) methyl- and/or ethyl- and/or chloro- and/or bromohydroquinone, optionally mixed with another (or other) diphenol(s), such as, for example, unsubstituted hydroquinone and/or one or more hydroquinone(s) disubstituted by the groups mentioned above, with, (2) optionally, a terephthalic acid derivative alone, or optionally mixed with a derivative of another aromatic carboxylic acid such as, for example, isophthalic acid, with, (3) a 4,4'-dicarboxydiphenyl ether derivative, and with, (4) an acid group derivative of para-aminobenzoic acid, either alone or optionally mixed with a derivative of the same type of another aromatic aminoacid such as, for example, meta-aminobenzoic acid, said acid derivative being either a halide such as, for example, a chloride, or an arylester such as, or example, a phenyl, tolyl or naphthyl ester (such derivative being, of course, a dihalide or a diester in the case of a dicarboxylic acid). The reaction is typically carried out in the presence of a catalyst, such as those described in Canadian Pat. No. 735,543.

In this process, the reagents are employed in proportions such that:

(i) the molar ratio diphenyl(s): diacid derivatives ranges from 0.95 to 1.05;

(ii) the amount of terephthalic acid derivative in the terephthalic acid+4,4'-dicarboxydiphenyl ether derivative mixture ranges from 0 to 70 mol %, preferably from 20 to 60 mol %;

(iii) the amount of para-aminobenzoic acid derivative ranges from 5 to 100 mol % relative to the amount of monosubstituted hydroquinone(s) and preferably from 10 to 60 mol %; and (iv) the total amount of reagents employed other than the monosubstituted hydroquinone(s), the terephthalic acid derivative, the 4,4'-dicarboxydiphenyl ether derivative and the para-aminobenzoic acid derivative is at most equal to 10 mol % relative to the amount of mono-substituted hydroquinone(s).

The copolyesteramides produced according to this first method generally have end groups of the phenolic H and/or H of NH$_2$ type on one end of the molecule and of the halo or aryloxy type on the other.

It is also possible to prepare the copolyesteramides of this invention by the direct esterification and amidification between the diphenol(s) envisaged, the aromatic dicarboxylic acids and the aromatic aminoacid(s). The copolyesteramides thus obtained generally have end groups of the phenolic H and/or H of NH$_2$ and acid OH type.

However, a third method, which employs an acidolysis reaction, is preferably used. According to this preferred method:

(1) a methyl- and/or ethyl- and/or chloro- and/or bromohydroquinone diester, optionally mixed with one (or more) diester(s) of another (or other) diphenol(s) such as, for example, unsubstituted hydroquinone and/or one or more hydroquinone(s) disubstituted by the groups mentioned above, is reacted with, (2) optionally, terephthalic acid alone, or optionally mixed with another aromatic dicarboxylic acid such as, for example, isophthalic acid, with, (3) 4,4'-dicarboxydiphenyl ether, and with, (4) an acylated derivative of para-aminobenzoic acid, acylated at the amine group, either alone or optionally mixed with an acylated derivative of the same type of another aromatic aminoacid such as, for example, meta-aminobenzoic acid, and the said diphenyl diester being formed from an alkanoic acid containing from 2 to 6 carbon atoms such as, for example, an acetic ester, and the said amine group-acylated aminoacid derivative being formed from an anhydride or a halide such as, for example, a chloride derived from an alkanoic acid containing from 2 to 6 carbon atoms such as, for example, an acetylated derivative.

The reaction is generally carried out, in this case as well, in the presence of a catalyst such as, especially, sodium, magnesium, manganese or zinc acetate, butyl titanate or antimony trioxide. It is generally carried out at a temperature of above 250° C. and the acid formed is then distilled. After collecting approximately 80% of the theoretical value of acid to be distilled, the temperature is gradually increased to a value above 280° C., while gradually decreasing the pressure at the same time. When the distillation of the acid is complete, the polycondensation is continued under a high vacuum for a period of time which may range up to 30 minutes.

In this acidolysis method, the reagents are employed in proportions such that:

(i) the molar ratio diphenol diester(s): total diacids ranges from 0.95 to 1.05;

(ii) the amount of terephthalic acid in the terephthalic acid+4,4'-dicarboxydiphenyl ether mixture ranges from 0 to 70 mol % and preferably from 20 to 60 mol %;

(iii) the amount of the acylated derivative of paraaminobenzoic acid, acylated at the amine group, ranges from 5 to 100 mol % relative to the amount of monosubstituted hydroquinone diester(s) and preferably from 10 to 60 mol %; and (iv) the total amount of reagents employed other than the monosubstituted hydroquinone diester(s), the terephthalic acid, the 4,4'-dicarboxydiphenyl ether and the acylated derivative of para-aminobenzoic acid is at most equal to 10 mol % relative to the amount of mono-substituted hydroquinone diester(s).

The copolyesteramides obtained according to this third method generally have end groups of the alkoxy and/or acylamino type on one end of the polymer and of the acid OH type on the other.

In order to further illustrate the present invention and the advantages thereof, the following specific examples are given, it being understood that same are intended only as illustrative and in nowise limitative.

In said examples to follow, a number of tests were carried out using the final product copolyesteramides. The procedures and/or standards according to which these tests were carried out are given below:

TORSIONAL MODULUS

This was determined at different temperatures using an automatic torsion pendulum at a frequency on the order of 1 Hertz according to the ISO standard R 537 method B, the specimens being conditioned at RH 50 according to the standard NF T 51,034. The results are expressed in MPa.

TENSILE TEST

The tensile strength and modulus were determined at 23° C. according to the specifications of the standard NF T 51,034 using dumbbell type specimens having a length of 4 mm and a width of 2 mm, conditioned at RH 50. The results are expressed in MPa.

FLEXURAL MODULUS

This determination was carried out at 23° C. according to the specifications of the standard NF T 51,001 using 80×4 mm rod type specimens, conditioned at RH 50. The results are expressed in MPa.

CHARPY impact strength

This was determined at 23° C. according to the specifications of the standard NF T 51,035 using 60×10×4 mm rod type specimens carrying U notches, conditioned at RH 50. The results are expressed in $kJ/m^2$.

EXAMPLE 1

The following reagents and catalysts were introduced into a polycondensation reaction which was stirred and heated and equipped with a device for distillation and for sweeping with an inert gas:

(1) Methylhydroquinone diacetate: 62.46 g

[molar ratio (1):(2)+(3)=1];

(2) Terephthalic acid: 19.92 g

[40 mol % in the (2)+(3) mixture];

(3) 4,4'-Dicarboxydiphenyl ether: 46.44 g

[60 mol % in the (2)+(3) mixture];

(4) Para-acetamidobenzoic acid: 21.48 g

[40 mol % relative to (1)];

(5) Magnesium acetate: 0.074 g

[500 ppm].

The reactor was purged with nitrogen and then heated using a metal bath adjusted at 265° C. Acetic acid began to distil after a few minutes, the first drop of acid which distilled corresponding to time zero. 36 cm³ of acetic acid (87.5% of the theoretical value) were collected after 17 minutes. The temperature of the metal bath was then gradually increased to 330° C. over 40 minutes; over the same time period, the pressure was decreased from $1,010 \times 10^2$ Pa to $13.3 \times 10^2$ Pa. The heating at 330° C. was continued for 15 minutes, while decreasing the pressure to $0.39 \times 10^2$ Pa over same time period. The total volume of acetic acid distilled was 40 cm³ (which amounted to 97.3% of the theoretical value).

The polymer obtained was white and fibrous in appearance. It had an inherent viscosity of 1.82 dl $g^{-1}$. The yield temperature was 290° C. The anisotropy region spanned from 300° C. to more than 360° C.

The values for torsional modulus as a function of temperature are reported in Table 1 below.

The results for tensile, flexural and impact determinations are reported in Table 2 below.

With regard to molded specimens enabling mechanical properties to be determined, these were prepared using a screw press commercially available under the trademark KAP. For this purpose, the copolyesteramide otained was ground and then dried for 4 hours at 150° C. and the granules formed were injection-molded under the following conditions:

(i) Melt-tank temperature: 320° C.;
(ii) Mold temperature: 50° C.;
(iii) Material injection pressure: 22.5 MPa.

As a comparative trial (trial A), the same operations as described above were carried out, but without including para-acetamidobenzoic acid in the polymer. Hence, the reagents and catalysts employed were as follows:

(1) Methylhydroquinone diacetate: 52.05 g

[molar ratio: (1):(2)+(3)=1];

(2) Terephthalic acid: 16.6 g

[40 mol % in the mixture (2)+(3);

(3) 4,4'-Dicarboxydiphenyl ether: 38.7 g

[60 mol % in the mixture (2)+(3);

(4) Magnesium acetate: 0.054 g

[500 ppm].

In this trial, a volume of 27 cm³ of acetic acid was recovered (which amounted to 94.4% of the theoretical value). The polymer obtained was white and fibrous in appearance. It had an inherent viscosity of 1.78 dl $g^{-1}$. The yield temperature was 280° C. The anisotropy region spanned from 280° C. to over 360° C.

TABLE I

| | | T °C. | | | | | | | | | |
|---|---|---|---|---|---|---|---|---|---|---|---|
| | | −40 | 0 | 20 | 60 | 80 | 100 | 120 | 140 | 180 | 200 |
| Torsional Modulus MPa | Example 1 | 1700 | 1500 | 1300 | 1000 | 950 | 900 | 800 | 500 | 310 | 290 |
| | Trial A | 1300 | 1100 | 900 | 700 | 600 | 500 | 400 | 200 | 150 | 130 |

As will be seen from Table 1, a better retention of modulus with changing temperature was observed for the polymer according to the present invention. The ratio modulus at 20° C.:modulus at 200° C. was equal to 4.48 for the polymer of Example 1, whereas it is equal to 6.92 for the polymer of trial A. The modulus determined at 120° C. for the polymer of the example was higher than that determined at 60° C. for the polymer of trial A (800 MPa as against 700 MPa).

EXAMPLE 2

The following materials were introduced into the same apparatus as that described in Example 1:

(1) Methylhydroquinone diacetate: 62.46 g

[molar ratio (1):(2)+(3)=1];

(2) Terephthalic acid: 19.92 g

[40 mol % in the mixture (2)+(3)];

(3) 4,4'-Dicarboxydiphenyl ether: 46.44 g

[60 mol % in the mixture (2)+(3)];

(4) Para-acetamidobenzoic acid: 10.74 g

[20 mol % relative to (1)];

(5) Magnesium acetate: 0.0696 g

[500 ppm].

The reaction was then carried out as in Example 1. A volume of 37 cm$^3$ of acetic acid was recovered (98% of the theoretical value). The polymer obtained was white and fibrous in appearance. It had an inherent viscosity of 2.15 dl g$^{-1}$. The yield temperature was 300° C. The anisotropy region spanned from 300° C. to over 360° C. The results of tensile, flexural and impact determinations are reported in Table 2 below:

TABLE II

| EXAMPLE/ TRIAL | TENSILE | | FLEXURAL | CHARPY IMPACT |
|---|---|---|---|---|
| | Strength MPa | Modulus MPa | Modulus MPa | STRENGTH kJ/m$^2$ |
| A | 140 | 3,330 | 3,675 | 27 |
| 1 | 135 | 4,580 | 5,610 | 14 |
| 2 | 110 | 4,115 | 4,830 | |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A high molecular weight thermotropic aromatic polyesteramide having an inherent viscosity of at least 0.3 dl g$^{-1}$, consisting of recurring structural units of the following formulae (I), (III) and (IV), and optionally (II):

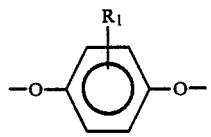
(I)

in which R$_1$ is a methyl or ethyl radical, or a chlorine or bromine atom, with said recurring structural units (I) either being identical or different;

(II)

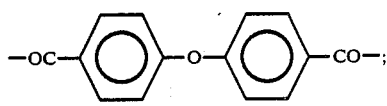
(III)

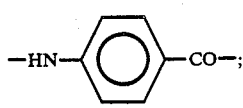
(IV)

and further wherein the molar ratio of the units (I) relative to the sum of the units (II)+(III) ranges from 0.95 to 1.05; the number of units (II) in the mixture (II)+(III) ranges from 0 to 70 mol % and the number of units (III) relative to the same mixture ranges from 100 to 30 mol %; the number of units (IV) relative to the number of units (I) ranges from 5 to 100 mol %; and said copolyesteramides having a yield temperature ranging from 200° to 350° C.

2. A thermotropic aromatic copolyesteramide as defined by claim 1, wherein the number of units (II) in the mixture (II)+(III) ranges from 20 to 60 mol % and the number of units (III), relative to the same mixture, ranges from 80 to 40 mol %, and the number of units (IV) relative to the number of units (I) ranges from 10 to 60 mol %.

3. A thermotropic aromatic copolyesteramide as defined by claim 1, wherein the recurring structural units (I) are identical and R$_1$ is a methyl radical or a chlorine atom.

4. A thermotropic aromatic copolyesteramide as defined by claim 1, having a yield temperature ranging from 260° to 330° C.

5. A thermotropic aromatic copolyesteramide as defined by claim 1, having an inherent viscosity of at least 0.5 dl g$^{-1}$.

6. A thermotropic aromatic copolyesteramide as defined by claim 5, having an inherent viscosity ranging from 0.5 to 4.0 dl g$^{-1}$.

7. A shaped article comprising a thermotropic aromatic copolyesteramide as defined by claim 1.

8. A shaped article as defined by claim 7, comprising a fiber.

9. A shaped article as defined by claim 7, comprising a film.

10. A shaped article as defined by claim 7, comprising an extrudate.

11. A shaped article as defined by claim 7, comprising a molded substrate.

* * * * *